United States Patent [19]

Okumura et al.

[11] Patent Number: 5,500,170
[45] Date of Patent: Mar. 19, 1996

[54] HEATING AND EXTRUDING METHOD AND DEVICE FOR BULK PREFORM

[75] Inventors: Toshiaki Okumura; Takao Ekimoto; Satoshi Shimamoto; Katsumi Ogawa; Masahiro Tomita; Yoshitaka Nimura; Ryosaku Kadowaki, all of Kobe, Japan

[73] Assignee: Kabushiki Kaisha Kobe Seiko Sho, Kobe, Japan

[21] Appl. No.: 348,159

[22] Filed: Nov. 28, 1994

Related U.S. Application Data

[63] Continuation of Ser. No. 28,194, Mar. 9, 1993, Pat. No. 5,458,838.

[30] Foreign Application Priority Data

| Mar. 11, 1992 | [JP] | Japan | 4-88024 |
| Jun. 4, 1992 | [JP] | Japan | 4-171794 |

[51] Int. Cl.$^6$ ............ B29B 11/10; B29B 11/16; B29C 47/16
[52] U.S. Cl. ............ 264/148; 264/167; 264/209.3; 264/209.8; 264/210.1; 264/257; 264/349; 425/113; 425/297; 425/381; 425/466
[58] Field of Search ............ 425/113, 466, 425/DIG. 38, DIG. 39, 296, 297, 381; 264/148, 167, 174, 176.1, 209.3, 151, 209.8, 210.1, 171, 40.1, 257, 349

[56] References Cited

U.S. PATENT DOCUMENTS

| 3,093,860 | 6/1963 | Eilersen | 425/466 |
| 3,096,543 | 7/1963 | Konopacke et al. | 425/46 |
| 3,611,491 | 10/1971 | Rector | 425/466 |
| 4,187,068 | 2/1980 | Vassar | 425/466 |
| 4,424,178 | 1/1984 | Daubenbüchel et al. | 425/381 |
| 4,778,367 | 10/1988 | Hilakos | 425/113 |

Primary Examiner—Jay H. Woo
Assistant Examiner—Duane S. Smith
Attorney, Agent, or Firm—Oblon, Spivak, McClelland, Maier & Neustadt

[57] ABSTRACT

A heating and extruding method for a bulk preform of a fiber reinforced composite material, including a stabbing machine for forming an unpenetrated hole in the bulk preform, a heating machine connected to the stabbing machine for heating the bulk preform by a nitrogen gas, and an extruding machine connected to the heating machine for heating and compressing the bulk preform heated by the heating machine to discharge a predetermined amount of the bulk preform, wherein at least the heating machine to the extruding machine has a sealing structure sealing a nitrogen gas therein. An extruding lip of the extruding machine has a thickness restriction plate and a width restriction plate for respectively adjusting an extrusion thickness and an extrusion width of the melted composite material. Accordingly, oxidation and degradation of resin composing the fiber reinforced composite material can be prevented. Further, a shape of the melted composite material to be extruded can be suited to a desired shape of a molded part to be obtained.

1 Claim, 3 Drawing Sheets

HEATING AND EXTRUDING METHOD AND DEVICE FOR BULK PREFORM

This is a continuation of application Ser. No. 08/028,194 filed on Mar. 9, 1993 now U.S. Pat. No. 5,458,838.

BACKGROUND OF THE INVENTION

The present invention relates to a heating and extruding method and device for a bulk preform formed of a thermosetting or thermoplastic synthetic resin material in which reinforcing fibers are uniformly dispersed.

A composite material composed of a thermosetting or thermoplastic synthetic resin and reinforcing fibers uniformly dispersed in the synthetic resin has excellent characteristics (especially, tensile strength and impact strength), and so the composite material is widely used as various materials for a panel, shell, body, container, etc. according to a thermal characteristic of the synthetic resin. Such a composite material is handled as a preform in the form of a sheet or a bulk or block before being finally formed into a molded part having a desired shape. In the course of obtaining the molded part from the preform, the preform is heated by any method according to the kind of the synthetic resin and the shape of the preform.

Conventionally, a sheet-like preform is generally used for the reason why it can be easily uniformly heated and it is superior in postformability upon compression molding into a molded part having a desired shape. A molding system using such a sheet-like preform is shown in FIG. 5. Referring to FIG. 5, a plurality of sheet-like preforms 3 are heated in a heating machine 1 such as an infrared heating oven before they are successively supplied into between an upper mold 5a and a lower mold 5b of a compression molding machine 2. That is, a resin sheet is previously cut into the sheet-like preforms 3 each having a suitable size according to a shape of a molded part, and the sheet-like preforms 3 are put on a conveyor 4 to be subjected to uniform heating in the heating machine 1. The sheet-like preforms 3 thus heated are stacked on the lower mold 5b according to a desired thickness of the molded part, and both the upper and lower molds 5a and 5b are approached each other to obtain the molded part having a desired thickness.

However, since the sheet-like preforms are heated in the atmospheric air, the resin material composing the sheet-like preforms is oxidized and degraded to often cause a reduction in quality of the molded part. Further, a part of the resin material is decomposed to liable to generate soot because of atmospheric heating, resulting in blackening of the molded part.

On the other hand, when using such sheet-like preforms, it is necessary to previously cut an elongated sheet into a plurality of sheet-like preforms and set them on the mold. Further, in the case where the molded part is thick, it is necessary to stack the sheet-like preforms on the mold. Thus, the sheet-like preforms heated to high temperatures must be handled to render the working troublesome and accompany danger. In addition, it is difficult to automate the step of supplying the heated sheet-like preforms to the compression molding machine.

Further, the use of the sheet-like preforms causes the following problems, and so the demand for use of bulk preforms has recently been increased.

(1) A manufacturing method for the sheet-like preforms is complicated to increase a manufacturing cost.

(2) The reinforcing fibers in the composite material are often broken in a kneading or preforming step, thus reducing a strength of the molded part.

(3) Before molding the sheet-like preforms, the resin sheet must be cut in consideration of a desired size of the molded part, and the sheet-like preforms must be often stacked on the mold in consideration of a desired shape and thickness of the molded part, thus reducing a molding efficiency and increasing a molding cost.

On the other hand, there has been disclosed in Japanese Patent Laid-open Publication No. 1-210315, for example, a technique of heating and metering a bulk preform before molding. That is, as shown in FIG. 6, an extruding machine 102 is used to quantitatively supply a melted composite to a compression molding machine 105.

More specifically, a heating machine 101 for heating a bulk preform A1 is connected to the extruding machine 102. A pressure cylinder 119 is provided at one end of a cylindrical extruding container 102a of the extruding machine 102, and an extruding lip 103 is provided at the other end of the container 102a. A bulk preform A2 heated is pressurized in the container 102a by the pressure cylinder 119, and is discharged as a melted composite A3 from an opening 107 of the extruding lip 103. The melted composite discharged in a predetermined amount is cut by a cutter 104 provided at the opening 107, and a melted composite A4 thus obtained is supplied to between an upper mold 106a and a lower mold 106b of the compression molding machine 105.

In cutting the melted composite discharged from the opening 107 of the extruding lip 103, an extrusion length of the melted composite is changed to be decided according to a weight of the molded part. However, an extrusion thickness and an extrusion width of the melted composite are not adjusted according to a desired shape of the molded part, but they are fixed. In other words, a shape (especially, a thickness and a width) of the melted composite is not always be suited to the desired shape of the molded part. Accordingly, spreading distances in a longitudinal direction and a lateral direction of the melted composite upon compressed by the upper and lower molds 106a and 106b are often unbalanced to cause orientation of reinforcing fibers in the molded part and therefore enlarge an anisotropy in strength of the molded part.

SUMMARY OF THE INVENTION

It is an object of the present invention to provide a heating and extruding method and device for a bulk preform of a fiber reinforced composite material which can prevent oxidation and degradation of resin composing the fiber reinforced composite material and can automatically supply a predetermined amount of the composite material to a compression molding machine or the like.

It is another object of the present invention to provide an extruding method and device for a fiber reinforced composite material which can suppress orientation of reinforcing fibers in a molded part and thereby obtain a uniform strength of the molded part.

According to a first aspect of the present invention, there is provided in a method of heating a bulk preform of a fiber reinforced composite material to a molding temperature, said bulk preform having an unpenetrated hole, and extruding said bulk preform from an extruding machine; the improvement comprising the steps of heating said bulk preform by an inert gas in a heating chamber and feeding said bulk preform to said extruding machine in a condition where said bulk preform is isolated from an atmospheric air.

According to a second aspect of the present invention, there is provided a heating and extruding system for a bulk preform of a fiber reinforced composite material, comprising a stabbing machine for forming an unpenetrated hole in said bulk preform, a heating machine connected to said stabbing machine for heating said bulk preform by a nitrogen gas, and an extruding machine connected to said heating machine for heating and compressing said bulk preform heated by said heating machine to discharge a predetermined amount of said bulk preform, wherein at least said heating machine to said extruding machine has a sealing structure sealing a nitrogen gas therein.

With this construction, the bulk preform is isolated from the atmospheric air during heating in the heating machine and feeding to the extruding machine. Accordingly, oxidation and degradation of the resin composing the fiber reinforced composite material are prevented. Further, blackening of the molded part with soot is prevented, and accordingly arbitrary colors may be used for the resin, that is, a degree of freedom of coloring can be ensured. Further, the bulk preform is heated by the inert gas circulated in the heating machine. Therefore, the bulk preform can be efficiently heated, and continuous production of molded parts can be effected. Further, the composite material is discharged in the form of a block by the extruding machine. Therefore, the work of supplying the composite material to a mold can be simplified and automated, thereby realizing an improvement in accuracy of extrusion amount of the composite material and manufacture of precise molded parts.

Further, a series of preform supplying, heating, extruding and molding steps can be fully automated to realize efficient production.

According to a third aspect of the present invention, there is provided in a method of extruding a fiber reinforced composite material in a melted condition from an extruding lip of an extruding machine to a compression molding machine; the improvement comprising the steps of adjusting an extrusion width and/or an extrusion thickness of said melted composite material in consideration of a shape and physical properties of a molded part to be obtained, and cutting said melted composite material into a predetermined length.

According to a fourth aspect of the present invention, there is provided an extruding machine having an extruding lip for extruding a fiber reinforced composite material in a melted condition and a cutter for cutting said melted composite material into a predetermined length, said extruding lip comprising a thickness restriction plate vertically movably provided at an opening of said extruding lip for restricting an extrusion thickness of said melted composite material to be extruded from said opening and/or a width restriction plate horizontally movably provided at said opening for restricting an extrusion width of said melted composite material to be extruded from said opening.

With this construction, orientation of reinforcing fibers in the molded part obtained can be suppressed, and variations in strength between a longitudinal direction and a lateral direction of the molded part can be reduced.

Further, a shape of the melted composite material to be supplied to the compression molding machine can be arbitrarily changed in accordance with a desired shape and physical properties of the molded part, thereby effecting efficient production of the molded part.

Other objects and features of the invention will be more fully understood from the following detailed description and appended claims when taken with the accompanying drawings.

DETAILED DESCRIPTION OF THE PREFERRED EMBODIMENTS

Figure 1:
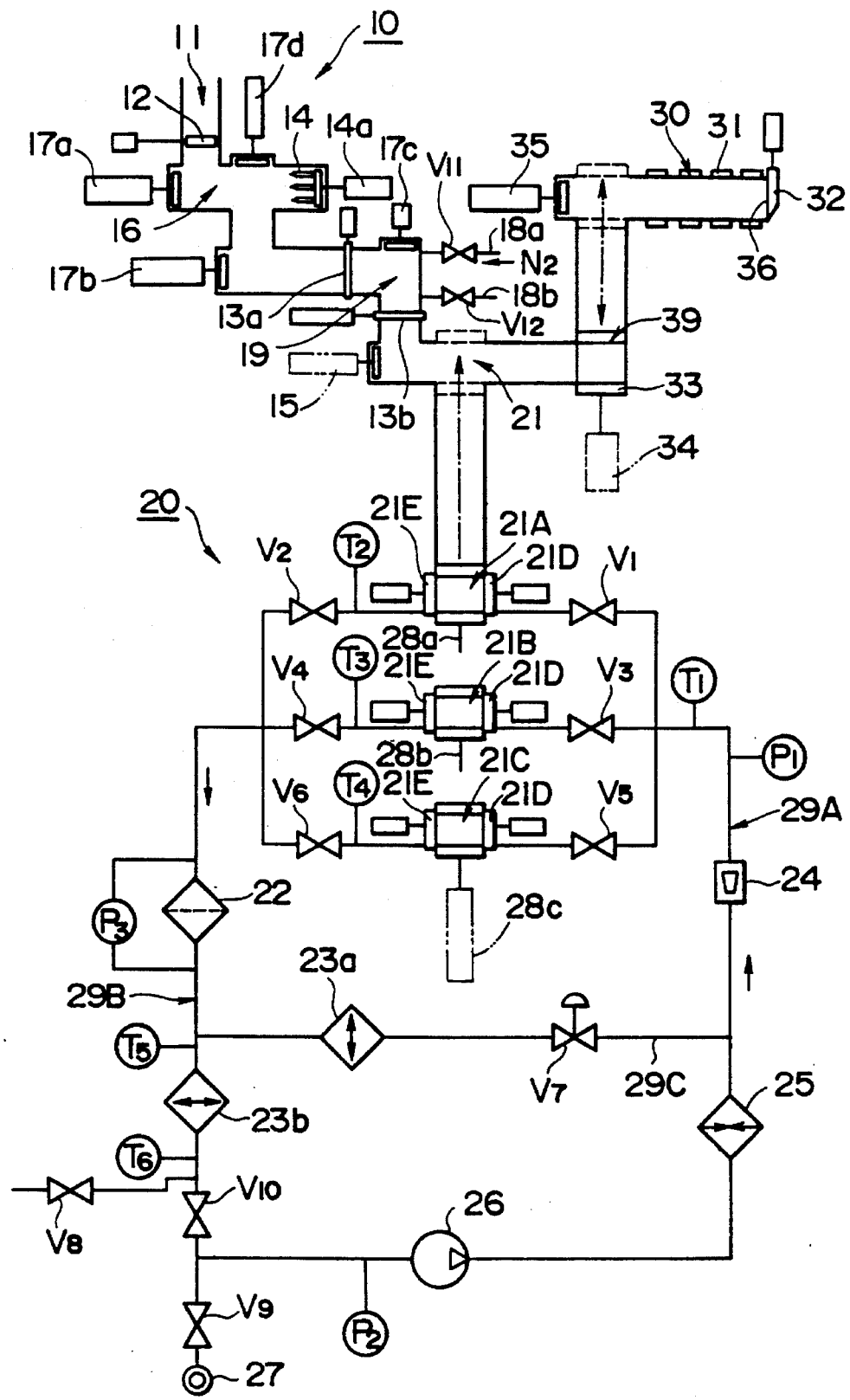
FIG. 1 is a diagrammatic illustration of a heating and extruding system according to a preferred embodiment of the present invention.
Figure 2:
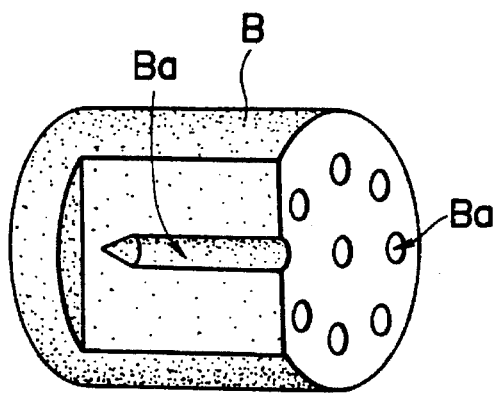
FIG. 2 is a partially cutaway perspective view of a preform to be used in the system shown in FIG. 1.

Referring to FIG. 1, there is shown a heating and extruding system for a bulky or block-like preform according to a preferred embodiment of the present invention. The heating and extruding system is generally constituted of a stabbing machine 10, a heating machine 20 and an extruding machine 30. Referring to FIG. 2, reference character B designates an example of the preform to be used in the heating and extruding system. The preform B is cylindrical, and it has a plurality of unpenetrated holes Ba. It is to be noted that the shape of the preform B is merely illustrative and that the preform B may have a single unpenetrated hole. The unpenetrated holes Ba of the preform B are adapted to be formed by the stabbing machine 10 as will be hereinafter described in detail.

The stabbing machine 10 includes a receiving section 11 for receiving a solid preform to be formed into the preform B and a stabbing section 16 for stabbing the solid form to form the unpenetrated holes Ba in the preform B. The receiving section 11 is provided with a stopper 12 for temporarily stopping the solid form received. The stabbing section 16 is provided with a plurality of needles 14 for forming the unpenetrated holes Ba in the preform B. The needles 14 are adapted to be driven to move back and forth by a drive cylinder 14a. Each needle 14 incorporates a cartridge heater (not shown), and is adapted to be heated thereby. The stabbing machine 10 is further provided with a pusher 17a for pushing the solid preform toward the needles 14 and pushers 17b, 17c and 15 for pushing the preform B to lead the same in a passage 19 to a supply section 21 connected with the heating machine 20.

A pair of gates 13a and 13b are openably provided in the passage 19 to seal the passage 19. A nitrogen gas supply pipe 18a is connected through a shut-off valve V11 to the passage 19 between the gates 13a and 13b, and an air exhaust pipe 18b is connected through a shut-off valve V12 to the passage 19 between the gates 13a and 13b. Thus, the passage 19 is adapted to be maintained in an inert gas atmosphere by operating the shut-off valves V11 and V12.

The heating machine 20 is provided with three heating chambers 21A, 21B and 21C respectively having hydraulic plungers 28a, 28b and 28c each for receiving the preform B from the supply position 21 and returning the preform B after heating the same to the supply position 21. A heating gas supply pipe 29A and a heating gas exhaust pipe 29B are connected to each of the heating chambers 21A to 21C. A nitrogen gas supply source 27 is connected to one end of the heating gas supply pipe 29A. A blower 26, a heater 25, a flowmeter 24, a thermometer T1 and pressure gauges P1 and P2 are provided in a main passage of the heating gas supply pipe 29A, and three shut-off valves V1, V3 and V5 are provided in three branch passages of the heating gas supply pipe 29A connected to the heating chambers 21A to 21C, respectively. On the other hand, three shut-off valves V2, V4 and V6 and three thermometers T2, T3 and T4 are provided in three branch passages of the heating gas exhaust pipe 29B connected to the heating chambers 21A to 21C, respectively. A filter 22, a cooler 23b, thermometers T5 and T6 and a shut-off valve V10 are provided in a main passage of the heating gas exhaust pipe 29B. A differential pressure gauge P3 is provided across the filter 22 to determine a choked condition of the filter 22. A shut-off valve V8 is provided in another branch passage of the heating gas exhaust pipe 29B leading to the outside from a position just upstream of the shut-off valve V10. A shut-off valve V9 is connected to the shut-off valve V10 on the downstream side thereof, and a downstream end of the main passage of the heating gas exhaust pipe 29B is connected to an upstream end of the main passage of the heating gas exhaust pipe 29A between the shut-off valves V10 and V9. The shut-off valve V9 is connected to the nitrogen gas supply source 27. Further, a bypass pipe 29C is connected between the main passage of the heating gas supply pipe 29A and the main passage of the heating gas exhaust pipe 29B. A flow control valve V7 and a cooler 23a are provided in the bypass pipe 29C.

Another passage 39 is connected to the supply pipe 21, and the extruding machine 30 is connected through the passage 39 to the heating machine 20. A waiting position 33 is provided in the passage 39 to temporarily rest the preform B heated by the heating machine 20. A pusher 34 is provided at the waiting position 33 to load the preform B into the extruding machine 30. A heater 31 is provided around the extruding machine 30 to melt the preform B loaded into the extruding machine 30. A plunger 35 for compressing and extruding the preform B is provided at one end of the extruding machine 30, and a discharge opening 36 for discharging the preform B melted is formed at the other end of the extruding machine 30. Further, a cutter 32 is provided at the discharge opening 36 to cut the preform B discharged as a melted composite with a predetermined amount from the discharge opening 36.

In operation, the needles 14 in the stabbing machine 10 are preliminarily heated by the cartridge heaters. A heating temperature of the needles 14 is set to be higher than a softening point of the resin forming the preform B and lower than a melting point thereof. In the case where the resin forming the preform B is polypropylene, the surface temperature of the needles 14 is set to about 150° C.

Further, the heating chambers 21A to 21C and the passage 39 at the waiting position 33 are heated by heating medium type temperature regulators provided thereabout to a temperature higher than the softening point of the resin and lower than the melting point thereof. Further, the extruding machine 30 is heated by the heater 31 over the melting point of the resin. In the case where the resin is polypropylene, the extruding machine 30 is heated to about 220° C.

On the other hand, an inlet lid 21D and an outlet lid 21E of each of the heating chambers 21A to 21C are opened, and the shut-off valves V1 to V6 and V8 are opened. Further, the shut-off valve V10 is closed. Thereafter, the shut-off valve V9 is opened to charge a nitrogen gas into the heating gas supply pipe 29A, the heating chambers 21A to 21C and the heating gas exhaust pipe 29B. Accordingly, the air in the heating machine 20 is substituted by the nitrogen gas. Thereafter, the shut-off valves V8 and V9 are closed, and the shut-off valve V10 is opened. Further, the blower 26 is actuated, and the heater 25 is also actuated to thereby raise the temperature of the nitrogen gas at the inlets of the heating chambers 21A to 21C. In the case where the resin is polypropylene, the temperature of the nitrogen gas is set to about 240° to 250° C. After the temperature of the nitrogen gas becomes a predetermined temperature, the shut-off valves V1, V3 and V5 are closed. As a result, a pressure in the heating gas supply pipe 29A increased. Thereafter, when the pressure becomes a set pressure to be detected by the pressure gauge P1, the flow control valve V7 is opened to allow the nitrogen gas in the heating gas supply pipe 29A to be introduced into the bypass pipe 29C and bypassed to the heating gas exhaust pipe 29B. The above set pressure is set to 0.5 kgf/cm$^2$, for example.

Then, the solid preform received from the receiving section 11 is introduced into the stabbing section 16 by operating the stopper 12, and the needles 14 are stabbed into the solid preform by utilizing the pusher 17a to thereby form the unpenetrated holes Ba in the preform B. Then, the preform B is fed into the passage 19 in the open condition of the gates 13a and 13b by operating the pushers 17d and 17b, and the gate 13a is then closed to seal the passage 19. In this condition, the shut-off valves V11 and V12 are opened to introduce the nitrogen gas from the nitrogen gas supply pipe 18a into the passage 19 and exhaust the air from the passage 19 to the air exhaust pipe 18b. Then, the preform B is fed to the supply position 21 by operating the pushers 17c and 15, and the gate 13b is then closed.

Then, the preform B is supplied from the supply position 21 to any one of the heating chambers 21A to 21C by retracting a corresponding one of the hydraulic plungers 28a to 28c, and is held between the inlet lid 21D and the outlet lid 21E of the selected heating chamber 21A, 21B or 21C. After sealing this heating chamber, the shut-off valves V1 and V2 (or V3 and V4, or V5 and V6) are opened to introduce the nitrogen gas previously heated to a predetermined temperature, thereby heating the preform B in the heating chamber. Similarly, other preforms B are successively supplied into the other heating chambers at given timed intervals. Thus, the preforms B are heated in the heating chambers 21A to 21C for a given period of time (e.g., about three minutes in the case of polypropylene). Thereafter, the preforms B are successively returned to the supply position 21 by advancing the hydraulic plungers 28a to 28c. In the above heating process by the heated nitrogen gas, the outer periphery of the preform B is heated to a temperature so that the shape of the preform B may be maintained, that is, a temperature higher than the softening point of the resin and lower than the melting point thereof. Further, the nitrogen gas discharged from the heating chambers 21A to 21C is filtrated by the filter 22 to remove the fibers or the like released from the preform B, and the nitrogen gas thus filtrated is re-used for heating in the next cycle. The flow of the nitrogen gas flowing in the heating machine 20 is controlled by the flowmeter 24, and the temperature of the nitrogen gas is controlled by the thermometers T1 to T6.

After the heating of the preform B in the heating chamber 20A, for example, is completed, the shut-off valves V1 and V2 are closed, and the inlet lid 21D and the outlet lid 21E of the heating chamber 21A are retracted to return the preform B to the supply position 21 by advancing the hydraulic plunger 28a. Then, the preform B is fed from the supply position 21 to the waiting position 33 by the pusher 15, and is further fed from the waiting position 33 through the passage 39 to the inlet of the extruding machine 30.

Then, the preform B is loaded into the extruding machine 30 by the plunger 35, and is discharged in every predetermined amount from the discharge opening 36, then being cut by the cutter 32 to be fed to a compression molding machine (not shown). A limit of forward movement of the plunger 35 is controlled by a pressure switch (not shown) provided on a hydraulic cylinder (not shown) for operating the plunger 35, so that the preform B in the extruding machine 30 is compressed by a constant pressure exerted by the plunger 35. The subsequent preform B is similarly loaded into the extruding machine 30 after retracting the plunger 35, and is similarly compressed by the plunger 35 under the constant pressure.

In the extruding machine 30, the preform B is further heated to be completely melted by the heater 31, thus forming a melted composite. The melted composite is discharged from the discharge opening 36 in a predetermined amount by advancing the plunger 35 in a predetermined stroke, and is then cut by the cutter 32. The predetermined stroke is detected preferably by a position detector for the plunger 35 or a delivery detector, thereby effecting automatic control of a predetermined discharge amount. Further, a sensor capable of measuring a temperature and a pressure of the melted composite may be provided at the discharge opening 36 of the extruding machine 30 to control the plunger 35 and the heater 31.

Figure 4:
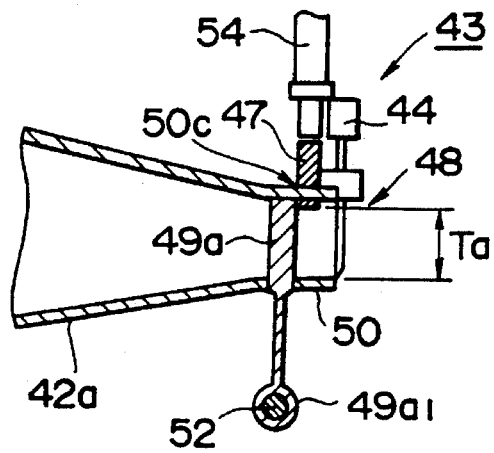
FIG. 4 is a cross section taken along the line IV—IV in FIG. 3.
Figure 3:
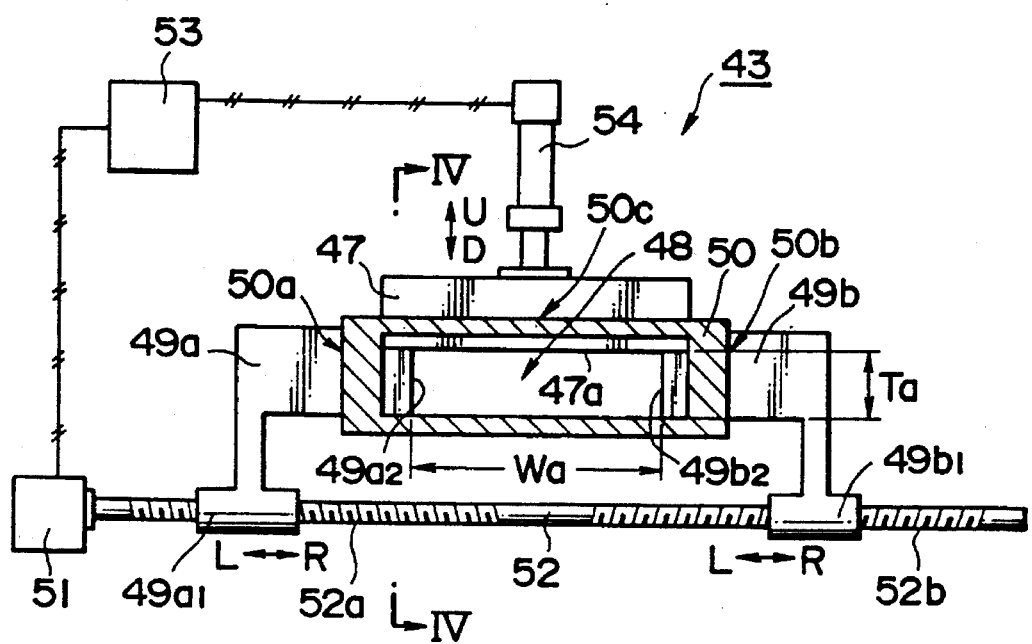
FIG. 3 is a front elevation of an extruding lip according to another preferred embodiment of the present invention.
Figure 5:
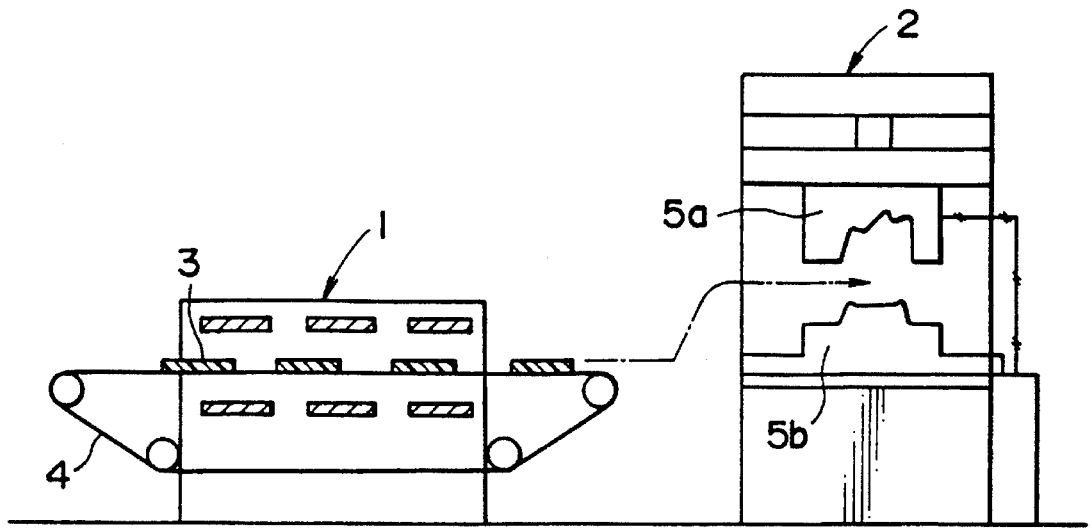
FIG. 5 is a schematic side elevation of a molding system in the prior art.

Referring next to FIGS. 3 and 4, there is shown an extruding machine according to another preferred embodiment of the present invention. Reference numeral 43 generally designates an extruding lip of the extruding machine. As shown in FIG. 4, the extruding lip 43 has a tapering container 42a and a rectangular prismatic discharge end portion 50. As shown in FIG. 3, the discharge end portion 50 has a rectangular opening 48. An upper wall of the discharge end portion 50 is formed with a slit 50c. A thickness restriction plate 47 is inserted through the slit 50c to restrict an extrusion thickness of a melted composite to be extruded from the opening 48. A vertical cylinder 54 is fixed at a lower end thereof to an upper end of the thickness restriction plate 47 to move the thickness restriction plate 47 in a direction depicted by arrows U and D. An upper end of the vertical cylinder 54 is fixed to a frame (not shown).

Further, right and left side walls of the discharge end portion 50 are formed with slits 50a and 50b, respectively. A pair of width restriction plates 49a and 49b are inserted through the slits 50a and 50b, respectively, to restrict an extrusion width of the melted composite to be extruded from the opening 48. The width restriction plates 49a and 49b are formed with internal thread portions 49a1 and 49b1, respectively, which are reverse to each other in thread hand. The internal thread portions 49a1 and 49b1 are threadedly engaged with external thread portions 52a and 52b of a screw rod 52, respectively. The screw rod 52 is connected at one end thereof to a drive motor 51. Accordingly, when the screw rod 52 is rotated by the drive motor 51, the width restriction plates 49a and 49b are moved toward or away from each other in a direction depicted by arrows L and R.

Thus, a height Ta of the opening 48 can be changed by vertically moving the thickness restriction plate 47, and a width Wa of the opening 48 can be changed by horizontally oppositely moving the width restriction plates 49a and 49b. The thickness restriction plate 47 may be provided through a lower wall of the discharge end portion 50, or a pair of thickness restriction plates each similar to the plate 47 may be provided through the upper wall and the lower wall of the discharge end portion 50. Further, either the width restriction plate 49a or 49b may be eliminated. Further, the cylinder 54 for moving the thickness restriction plate 47 and the screw rod 52 for moving the width restriction plates 49a and 49b may be replaced by any other known moving means such as a rack and pinion or a chain mechanism.

Further, either the thickness restriction plate 47 or the width restriction plates 49a and 49b may be eliminated to change either the thickness or the width of the melted composite in the case where a change in shape of the molded part is little.

Further, in order to reduce a discharge resistance of the melted composite to be discharged from the opening 48, inner end portions of the thickness restriction plate 47 and/or the width restriction plates 49a and 49b may be tapered so as to gradually decrease in thickness, or these restriction plates may be moved obliquely with respect to the container 42a.

A cutter 44 for cutting the melted composite discharged from the opening 48 is provided across the opening 48. The vertical cylinder 54, the drive motor 51 and the cutter 44 are connected to a control device 53, and they are controlled to operate in a predetermined amount by signals from the control device 53. That is, when a desired width, length and thickness of the molded part and in some case, a density, etc. of the molded part are input into the control device 53, the control device 53 computes the width Wa and the height Ta of the opening 48 and a required extrusion amount of the melted composite. Then, on the basis of the result of computation, the control device 53 controls the operation of the vertical cylinder 54, the drive motor 51 and the cutter 44, thereby restricting a thickness, width and length of the melted composite to be discharged from the opening 48.

According to this preferred embodiment, the extrusion width and the extrusion thickness of the melted composite to be discharged from the extruding lip 43 can be desirably changed. Accordingly, the shape of the melted composite can be suited to the desired shape and physical properties of the molded part, and a balance in spreading distance between a longitudinal direction and a lateral direction of the melted composite flowing on a mold can be taken in compression molding. Accordingly, orientation of reinforcing fibers in a certain direction can be suppressed. As a consequence, variations in strength between a longitudinal direction and a lateral direction of the molded part can be prevented to thereby realize uniformity of the molded part.

The invention will be more clearly understood with reference to the following example.

EXAMPLE

To obtain a sheet formed of polypropylene resin containing 30% of glass fiber (fiber length: 13 mm) as a molded part having a width of 80 cm, a length of 80 cm, a thickness of 0.5 cm, and a weight of 350 g, a bulk preform having a void ratio of 50% was uniformly heated by a nitrogen gas at 240° C., and a melted composite from the bulk preform was extruded from the extruding lip 43 into a compression molding machine. In the extrusion of the melted composite, the width restriction plates 49a and 49b, the thickness restriction plate 47 and the cutter 44 were controlled so as to obtain the melted composite having a width of 42.5 cm, a length of 42.5 cm and a thickness of 2 cm.

Figure 6:
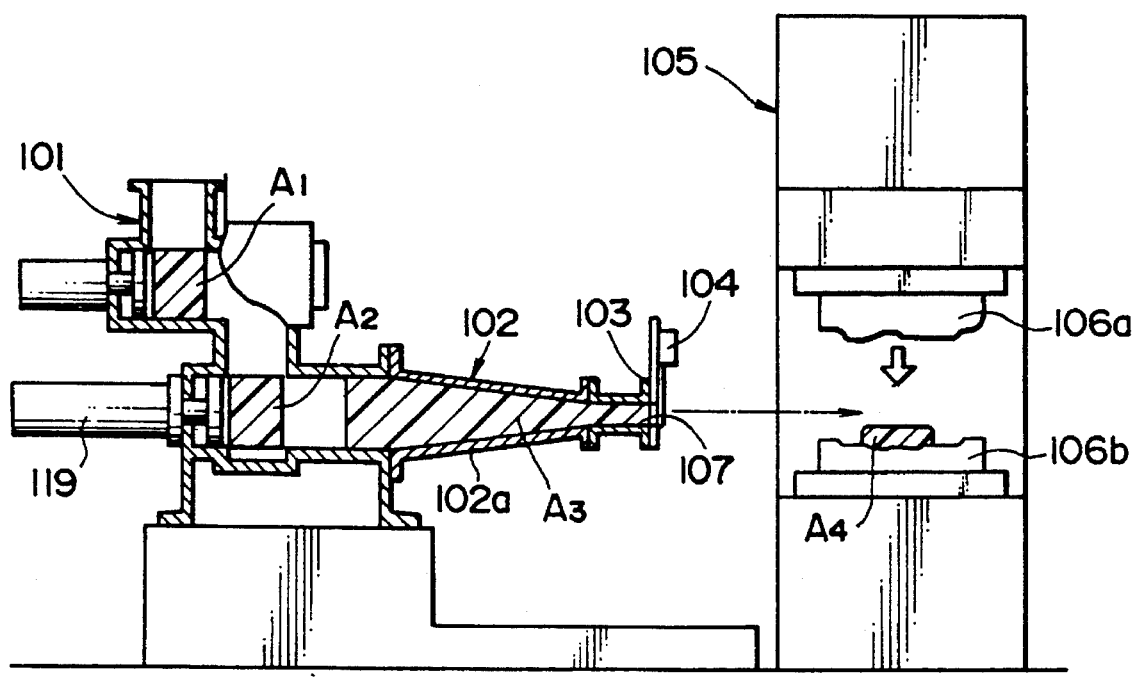
FIG. 6 is a schematic side elevation of an extruding machine for a melted composite material in the prior art.

In contrast thereto, a melted composite having a width of 18 cm, a length of 50 cm and a thickness of 4 cm was prepared by using the extruding lip 103 in the prior art shown in FIG. 6 to obtain a molded part having the above-mentioned size.

Then, a bending strength, a bending modulus and a Charpy impact strength of these molded parts in a longitudinal direction and a lateral direction thereof were measured. The result of measurement is shown in Table 1.

TABLE 1

|  | Present Invention | | Comparison | |
| --- | --- | --- | --- | --- |
| Charged Weight in Mold | 361 g | | 360 g | |
| Charged Size in Mold | 42.5 × 42.5 × 2 (cm) | | 18 × 50 × 4 (cm) | |
|  | Long. | Lat. | Long. | Lat. |
| Bending Strength (MPa) | 129 | 127 | 134 | 108 |
| Bending Modulus (GPa) | 4.8 | 4.7 | 5.0 | 3.9 |
| Charpy Impact Strength (KJ/cm$^2$) | 58 | 55 | 60 | 46 |

As apparent from Table 1, by preparing a melted composite having a shape suited to a desired shape of a molded part, variations in strength between a longitudinal direction and a lateral direction of the molded part can be reduced to realize uniform mechanical properties.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A method of molding a part, comprising the steps of:

extruding a fiber reinforced composite material in a melted condition from an extruding lip of an extruding machine to a compression molding machine;

adjusting at least one of an extrusion width and an extrusion thickness of the exterior dimension of said melted composite material being extruded from the extruding lip in consideration of a shape and physical properties of a mold for a molded part to be obtained;

cutting said melted composite material to a desired length; and molding the part in the mold.

* * * * *